United States Patent [19]

Strope et al.

[11] Patent Number: 5,129,057
[45] Date of Patent: Jul. 7, 1992

[54] METHOD FOR PRESENTING COMPRESSED ELECTRONIC DAY CALENDAR INFORMATION IN AN INTERACTIVE INFORMATION HANDLING SYSTEM

[75] Inventors: Gerald C. Strope, Grapvine; Donna F. Murray, Euless, both of Tex.

[73] Assignee: International Business Machines Corporation, Armonk, N.Y.

[21] Appl. No.: 689,082

[22] Filed: Apr. 19, 1991

Related U.S. Application Data

[63] Continuation of Ser. No. 476,144, Feb. 6, 1990, abandoned, which is a continuation of Ser. No. 188,927, May 2, 1988, abandoned.

[51] Int. Cl.⁵ .................................................. G06F 3/37
[52] U.S. Cl. .................................... 395/161; 340/706; 40/107; 368/41
[58] Field of Search ............... 364/518, 521; 340/706, 340/721, 747, 750; 368/41, 10; 40/107

[56] References Cited

U.S. PATENT DOCUMENTS

| | | | |
|---|---|---|---|
| 4,451,895 | 5/1984 | Sliwkowski | 364/521 |
| 4,550,386 | 10/1985 | Hirosawa et al. | 364/900 |
| 4,591,840 | 5/1986 | Curtis et al. | 340/706 |
| 4,626,836 | 12/1986 | Curtis et al. | 340/706 |
| 4,786,897 | 11/1988 | Takanashi et al. | 340/721 |
| 4,890,258 | 12/1989 | Tsugei et al. | 364/900 |

OTHER PUBLICATIONS

Research Disclosure—"Surrogate Calendar Keeper (Calendar Saver)" 2244 Research Disclosure Apr. 1987 No. 276, 27632.

Primary Examiner—Gary V. Harkcom
Assistant Examiner—Phu K. Nguyen
Attorney, Agent, or Firm—Andrew J. Dillon

[57] ABSTRACT

A method of simultaneously displaying day calendar information on the screen of an interactive terminal of an information handling system along with data being processed by an application program. The day calendar data is displayed in a first view port in a compressed format which indicates busy and free time periods, while data from an application program is displayed in a second viewport. The information in the two simultaneously displayed viewports provides an improved interactive user interface in that the terminal user does not have to interrupt the task that he is working on to determine the availability of a certain time period. When the terminal is interconnected to other terminals by a network, the method provides an indication in the first viewport for the terminal user that is actively engaged in an application program, that a second user of a terminal on the network has calendared an event on the first user's calendar. The terminal user has the option of viewing the event immediately or at some other time that is more appropriate. The method also allows the terminal user to display day calendar data in compressed mode either for the next day or the previous day merely by selecting specific buttons displayed in the second viewport for this function.

10 Claims, 3 Drawing Sheets

```
34                          DAY CALENDAR
31  │VIEW  MOVE  COPY  ADD  DELETE  CALENDAR  FIND  PROOF  PRINT  EXIT│
        DATE  FEB. 29 88    CALENDAR FOR I.M. USER
                        CMD  START    END    SEC    DESCRIPTION      49
```

| 38 | 8:00am  |    | 39 | 9:00am  10:00am | Meeting with Don Smith about E3 |
|    | 8:30am 42 |  |    |                 | Editor. His office. |
|    | 9:00am  |    |    | 10:00am 12:00n  | Department meeting to update members on the move to new offices and general update on work status. |
|    | 9:30am  |    |    |                 | |
|    | 10:00am |    |    |                 | |
|    | 10:30am 43 |  |    | 11:00am 12:30pm | Design Group Review  6F13 |
|    | 11:00am |    |    |                 | This meeting is to review the work thats been going on for our 60 day work effort. Bring accomplishments and concerns. Only 10 more days to go. For some that's good, for others well ..... Please don't forget to keep your people updated for this meeting and the results from it. |
|    | 11:30am |    |    |                 | |
|    | 12:00n  | Th | 41 |                 | |
|    | 12:30pm |    |    |                 | |
|    | 1:00pm  |    | 40 | 47      48      | |
|    | 1:30pm  |    |    |                 | |
|    | 2:00pm  |    |    |                 | |
|    | 2:30pm 45 |  |    |                 | |
|    | 3:00pm  |    |    |                 | |
|    | 3:30pm  |    |    |                 | |

33  MESSAGE AND PROMPT AREA

32    F1=HELP    F3=CANCEL    F7=PREV DAY    F8=NEXT DAY    F10=EXIT

FIG. 4

| DATE | CALENDAR NAME | CALENDAR USER | START TIME | END TIME | SEC-UR'Y | EVENT DESCRIPTION |
|------|---------------|---------------|------------|----------|----------|-------------------|
| 022988 | MAIN | USER IMA | 9:00am | 10:00am |  | Meeting with Don Smith about E3 Editor. His office. |
| 022988 | MAIN | USER IMA | 10:00am | 12:00n |  | Department meeting to update members on the move to new offices and general update on work status |
| 022988 | MAIN | USER IMA | 11:00am | 12:30pm |  | Design Group Review  6F13  This meeting is to review the work thats been going on for our 60 day work effort. Bring accomplishments and concerns. Only 10 more days to go. For some that's good, for others well .....  Please don't forget to keep your people updated for this meeting and the results from it. |

METHOD FOR PRESENTING COMPRESSED ELECTRONIC DAY CALENDAR INFORMATION IN AN INTERACTIVE INFORMATION HANDLING SYSTEM

This application is a continuation of application Ser. No. 07/476,144, filed Feb. 6, 1990, now abandoned, which is a continuation of application Ser. No. 07/188,927, filed May 2, 1988, which is now abandoned.

FIELD OF THE INVENTION

This invention relates in general to electronic calendaring methods and in particular to a method of displaying compressed day calendar information simultaneously with data being displayed by a separate application program.

CROSS-REFERENCED APPLICATIONS

1. U.S. Pat. No. 5,023,851, Ser. No. 07/178,725, filed on Apr. 6, 1988, in the name of Murray et.al., entitled "Method for Presenting Electronic Calendar Information Simultaneously in Two Different Formats, discloses an arrangement where calendared events are represented in two separate viewports that are functionally interrelated so that detailed descriptive data describing an event that is calendared, is displayed in one viewport while the time period covered by that event is indicated in the second view port by a bar selectively positioned immediately adjacent TO one or more of the appropriate time slots that are displayed corresponding to the work day.

2. U.S. Pat. No. 4,807,154, Ser. No. 008,033, filed Jan. 29, 1987, entitled "Method For Developing Automatic Replies in an Interactive Electronic Calendaring System," and assigned to the assignee of the present application is directed to an electronic calendaring method in which a calendar owner can respond automatically to requests for participation in events being calendared by another person. The nature of the reply is based on an analysis of the parameters set forth in the request and an algorithm employing a set of prioritized criteria that the calendar owner has established to provide the automatic response.

3. U.S. Pat. No. 1,831,552, Ser. No. 07/008,034, filed Jan. 29, 1987 entitled "Method For Concurrently Displaying Entries From a Plurality of Different Electronic Calendars Based on Interactively Entered Criteria," and assigned to the assignee of the present application is directed to an electronic calendaring method in which a calendar owner can display a set of calendar entries from different calendars which have an interrelationship that the user defines by data that is entered into the system interactively.

4. U.S. Pat. No. 4,866,611 Ser. No. 008,249, filed Jan. 29, 1987, entitled "Method For Automatically Reconciling Entries on Two Copies of Independently Maintained Electronic Calendars," and assigned to the assignee of this application is directed to an electronic calendaring method in which a calendar owner who keeps a detached personal copy of his master calendar can automatically reconcile the calendar entries that have been made on each calendar copy, independently of the other since the last time the detached copy was made and interactively resolve calendar event conflicts.

5. U.S. Pat. No. 4,817,018, Ser. No. 008,038 filed Jan. 29, 1987, entitled "Electronic Calendaring Method Which Provides for Automatic Assignment of Alternates In Requested Events," and assigned to the assignee of this application is directed to an electronic calendaring method in which a calendar owner, who receives a request to participate in a calendared event originated by another calendar owner, can assign an alternate to the event that will be designated in the automatic response which reflects the assignment of an alternate to the event. The assignment of the alternate is based on the relationship of the information that accompanies the request and criteria that the calendar owner has pre-established for each potential alternate.

6. Co-pending application Ser. No. 138,535, filed Feb. 8, 1988, entitled "Method to Facilitate a Reply to Electronic Meeting Invitations in an Interactive Multi-terminal System Employing Electronic Calendars", is directed a method which facilitates the reply process to an electronic invitation to attend a meeting that is issued by one of the end users by arranging for the system to advise the invitee that a meeting notice is available for review in the "In Box" of the terminal. The method causes a composite screen to be built which simultaneously displays the meeting details and the relevant section, i.e. a day of entries, of the owner's calendar in a side by side format so that calendar entries are correlated to the meeting date and time. The composite display permits an interactive selection by the calendar owner end user of at least one option which can be either to accept the invitation and calendar the meeting or to reject the invitation.

BACKGROUND ART

The prior art has disclosed a number and variety of interactive electronic calendaring systems and methods. The objective of all of these systems is primarily to assist the person who, for a number of different reasons, maintains a calendar of future events containing various information about the event at entry points on the calendar which relate to the time of the event.

The increase of personal computers and intelligent workstations in recent years has made it possible for calendar owners to establish and maintain their calendars on these interactive type data processing systems.

Two general types of interactive electronic calendaring systems have thus evolved in the art. In one type of calendaring system, the owner of the calendar is generally also the user of the workstation and that workstation is generally not a part of a larger network. Generally, in these types of systems, the calendar functions involve presenting a screen to the user representing a day calendar divided into a number of time periods or time slots. Each period is capable of displaying a limited amount of text that the user enters. In some systems, the day calendar can scroll vertically to present more time periods to the user or horizontally to present longer text entries. The operator can generally "page" forward or backward and, in most arrangements, can display a requested date. These calendaring arrangements generally do not limit the type of event that is calendared nor the terminology employed at any of the entry points and, to that extent, function in the same manner as conventional manual calendars or appointment books. The electronic calendaring method and systems do have an advantage over the prior art manual calendaring of events in that the user generally has the ability to scan a time span involving a large number of days and identify calendared events quite rapidly.

The other type of calendaring arrangement that has developed in the prior art involves multi-user environments having a large number of terminals or workstations which are generally part of a larger communication network that has been established to permit the users to interact with each other and with data maintained on the data processing system. In this environment, a user at a terminal or workstation can send a message to one or more of the other users on the network and is notified when the addressees has received and read the message.

In both of the above environments there are two general formats employed for displaying calendar data related to a particular day. The first day calendar format comprises a plurality of time slots which are specifically identified as such on the screen. In this time structured format the period of the time slot for a particular application is fixed. In one application the time slot period may be fixed at 15 minutes. In another application the time slot period may be fixed at 30 minutes. Similarly the starting time and ending time for the day being displayed are generally pre-established in particular applications but different applications will have different starting and ending times for the calendar days. For example in one application the day calendar may cover 24 hours, i.e., 12:00 midnight to 11:59 p.m. In another application the day calendar will cover only 12 hours, i.e., from 6:00 a.m. to 6:00 p.m.

Since most display screens of interactive terminals are limited to generally 80 columns of text per line and approximately 20 lines of text, most calendar applications cannot display, on one screen, the entire period representing one complete day of calendared events. As a result the day calendar is allowed to scroll vertically between the starting time slot and the ending time slot. As a result the user generally cannot determine what free time is available merely by a quick glance at the calendar screen. The calendar must be scrolled. In a scenario where the user is attempting to determine what day is available for a three hour meeting in the late afternoon, he must page through each day calendar and when the calendar has to be scrolled to see the late afternoon time slots, considerable time can be involved.

In addition, in most applications, since the descriptive area is generally limited to one line to permit a larger number of time slots to be displayed, the description of the event is generally very cryptic. While some applications allow for horizontal scrolling to permit less cryptic descriptions of calendar events to be entered, the general consensus in the art is that such an approach merely confuses the operator and while it may alleviate the problem of cryptic descriptions, it creates other problems of the same nature and magnitude.

The second format employed in other electronic calendaring methods does not structure the number of descriptive lines allocated to a time slot or a calendar event. In this later format, the operator enters the start time and the end time of the event in prescribed areas on the first line and then can enter as much text as necessary (within reason) to describe the event plus any comments, reminders, or directions that are appropriate. The next event is calendared before or after the first event depending on the time of the event and is also allowed as many lines as is necessary to describe that event. The main advantage of this second format is that the user feels less constrained and generally is not faced with the problem of deciphering some cryptic entry that was made a month earlier. In environments where a user is permitted to use another persons calendar, a higher level of understanding of the events that are calendared is also achieved.

There are of course some disadvantages because if there are a number of entries for the day, the available free time is not that readily discernible, but requires a rather concentrated scan of the starting and ending times of each entry to determine the length of free time that might be available between calendar units. Considerable more vertical scrolling time may also be involved depending on the number of events calendared and the levels at which they are described.

Users of electronic calendaring systems generally favor one format or the other and quite often management is reluctant to change from one format to the other, even though a newer electronic calendaring system having considerable added function, may be available. The trauma for some users involved in the change of formatting approaches might discourage some from participating in the system.

The invention described in Cross-referenced application Ser. No. 07/178,725, is directed to a method of displaying to the user, calendar information in a manner that maintains the advantages of both formats so that prior users of either prior art format need not change their way of calendaring data but gain added advantages and functions over earlier prior art methods with which they are familiar.

A problem however, still exists for users of interactive terminals who maintain electronic calendars in that many users quite often are actively involved in a specific task on the terminal at the time they need to refer to their calendar. For example, the user may be actively involved in a task on his terminal, when (s)he remembers that there is a meeting scheduled sometime in the afternoon. The process for confirming the time for that meeting varies, depending on the sophistication of the particular electronic calendaring system and the operating system that is employed by the terminal. In some environments, the user may have to actually exit the application program that was active, call up the Calendar application program and access todays "day calendar" to confirm the time of the meeting. A similar number of steps are required to return to his point of departure in the application program.

In a more sophisticated environment, the user may be able to select a command, use a function key, or "hot key" to the calendar application and day calendar with a minimum of key strokes. However, if the user does not remember what that process is or executes it erroneously, productivity is adversely affected and the level of frustration of the user is increased. A number of other scenarios exist where it would be desirable to provide the terminal user with the ability to constantly display a compressed day format indicating at least his future "busy" and "free" periods, for viewing directly while another application is also displaying its information on the display screen. The present invention is directed to a method for use in an electronic calendaring application in which a compressed day calendar, indicating "busy times" during the current work day, is continually displayed to the user on the display screen of the terminal in a separate viewport simultaneously as the information being processed by the active application program is being displayed to the user in the main application viewport.

SUMMARY OF THE INVENTION

In accordance with the method of the present invention at least two separate viewports or windows are established on the screen. One viewport displays the information being processed by the active application program and is referred to as the application viewport. The other view port displays the user's day calendar in a compressed format and is referred to as the Compressed Day Calendar (CDC) viewport. The size of each viewport may be varied under the control of the user and so in practice the size of the CDC viewport will generally be determined primarily by the data display requirements of the active application program.

In the preferred embodiment, the CDC viewport has a width corresponding to one half of the display screen and is five display lines high. The condensed day calendar format therefore comprises a horizontal time line with appropriate indications of the various time slots that have been established on the user's main day calendar by the basic calendaring application. If the format of the user's main day calendar has established one-half hour time slots extending from 8:00 am to 5:00 pm, then the compressed format will display a horizontal time line with equally spaced vertical lines to indicate half-hour time slots. A second horizontal line, preferably underneath the time line, is used to appropriately label the indicated time slots.

The horizontal line immediately above the time line is employed to indicate time slots that have events calendared and is referred to as the "busy-bar" line. The indication employed on the "busy-bar" line is a horizontal bar which extends from the start time of the event to the end time of the event. The bars are generated automatically in accordance with the start and end time times of the events that have been calendared by the main calendaring application for the user.

The fourth display line immediately above the "busy-bar" line is referred to as the "conflict" line since it may be used to represent time slots during which two events have been scheduled and thus a schedule conflict exists for the user. A bar similar to the "busy-bars" is employed to represent the time slot(s) where a conflict exists. A second conflict line is also provided in the preferred embodiment which functions to indicate a time slot which has been calendared for three distinct events.

The present method further provides the user with an indication when another network user has just calendared an event on the first user's calendar. If the event just calendared is for the same day, i.e. today, a flashing "busy-bar" is displayed above the appropriate time slot on the time line. The user then has the option to view the event description immediately or at some future time. To view the event directly, a mouse selection cursor is positioned on the flashing bar, or a function key is operated which displays either a "pop-up" window continuing a description of the event or the uncompressed view of his day calendar maintained by the calendar application. If the event that was calendared is for a future day a separate flashing indicator is activated which operates like the flashing bar to display the details of the newly calendared event when the user selects this indicator.

It is therefore an object of the present invention to provide an improved electronic calendaring method for interactive display terminals.

Another object of the present invention is to provide an improved method for continuously displaying day calendar information on the screen of an interactive terminal.

A further object of the present invention is to provide a method for simultaneously displaying day calendar information in a useful compressed format simultaneously with data being displayed by an active application program.

A still further object of the present invention is to provide an improved method for displaying a compressed format day calendar in one viewport of the screen in which each time slot that is calendared has a busy-bar indicator displayed, and data from an application program is concurrently displayed in another viewport of the screen.

Objects and advantages other than those described above will become apparent from the following description of a preferred embodiment when read in connection with the drawing.

BRIEF DESCRIPTION OF THE DRAWING

FIG. 4 illustrates the display screen presented in response to the, user selecting the Calendar function on the Main Menu of FIG. 3.

FIG. 5 illustrates the data structure for storing the calendaring information in the system.

DESCRIPTION OF THE PREFERRED EMBODIMENT

Figure 1:
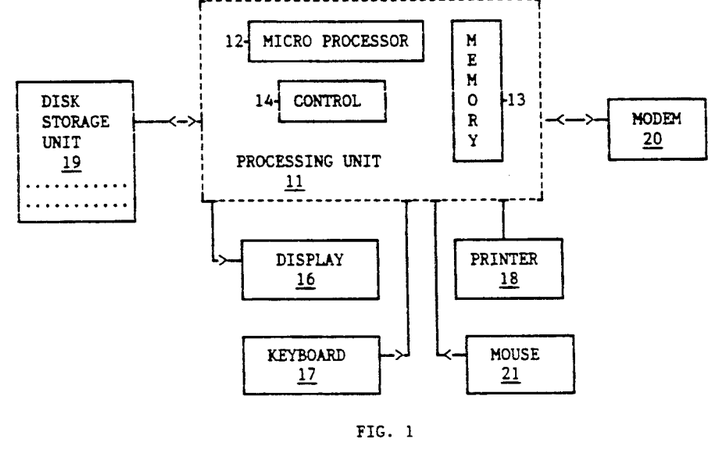
FIG. 1 is a functional block diagram of a terminal of an interactive information handling system in which the method of the present invention may be advantageously employed.

FIG. 1 illustrates the functional components of an interactive type data processing terminal on which the electronic calendaring method of the present invention may be advantageously employed The terminal comprises a processing unit 11 which includes a microprocessor block 12, a semiconductor memory 13, and a control block 14 which functions to control input/output operations in addition to the interaction between the micro processor block 12 and the memory unit 13.

The terminal further includes a group of conventional peripheral units including a display device 16, a keyboard 17, a printer 18, a disk storage unit 19, and a modem 20. Since the details of the above-described functional blocks form no part of the present invention and can be found in the prior art, only a brief functional description of each block is set forth, along with a description of their interactions, sufficient to provide a person of ordinary skill in the art with a basis of understanding applicants' improved method for displaying electronic calendar data.

Processing unit 11 corresponds to the "system unit" of a personal computer system such as the IBM XT personal computer, IBM AT personal computer or PS/2 personal computer. Unit 11 is provided with an operating system program which may be one of the many versions of DOS (Disk Operating System) which is normally employed to run the systems. The operating system program is stored in memory 13 along with one or more application programs that the user has selected to run. Depending on the capacity of memory 13 and the size of the application programs, portions of these programs, as needed, may be transferred to memory 13 from the disk storage unit 19 which may include, for example, a 30 megabyte hard disk drive and a diskette drive. The basic function of the disk storage unit is to store programs and data that are employed by the system and which may readily be transferred to the memory unit 13 when needed. The function of the diskette drive is to provide a removable storage function for entering programs and data into the system, and a vehicle for storing data in a form that is readily transportable for use on other terminals or systems.

Display device 16 and keyboard 17 together provide for the interactive nature of the terminal, in that in normal operation, the interpretation that the system gives to a specific keystroke by the operator depends, in substantially all situations, on what is being displayed to the operator at that point in time.

In some situations, the operator, by entering commands into the system, causes the system to perform a certain function. In other situations, the system requests the entry of certain data, generally by displaying a prompt type of menu/message screen. The depth of the interaction between the operator and the system varies by the type of operating system and the application program, but is a necessary characteristic of terminals on which the method of the present invention may be employed.

The terminal shown in FIG. 1 further includes a printer 18, which functions to provide hard copy output of data developed or stored in the terminal. The modem 20 functions to transfer data from the terminal of FIG. 1 to a host system through one or more communication links which may be a commercial type link or a dedicated communication link as shown schematically in FIG. 2. Lastly, a mouse 21 is provided to select items that are displayed by moving a selecting cursor that is displayed on the screen and is positional by the mouse.

Figure 2:
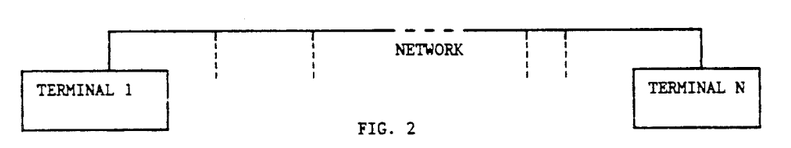
FIG. 2 is a functional block diagram of a network of interconnected terminals of the type shown in FIG. 1.

FIG. 2 represents schematically a network of terminals of the type shown in FIG. 1 which have the ability to communicate with each other through the network. These networks generally include a Host processing system for storing data that is available to all terminals and is responsible for controlling and managing the network.

Figure 3:
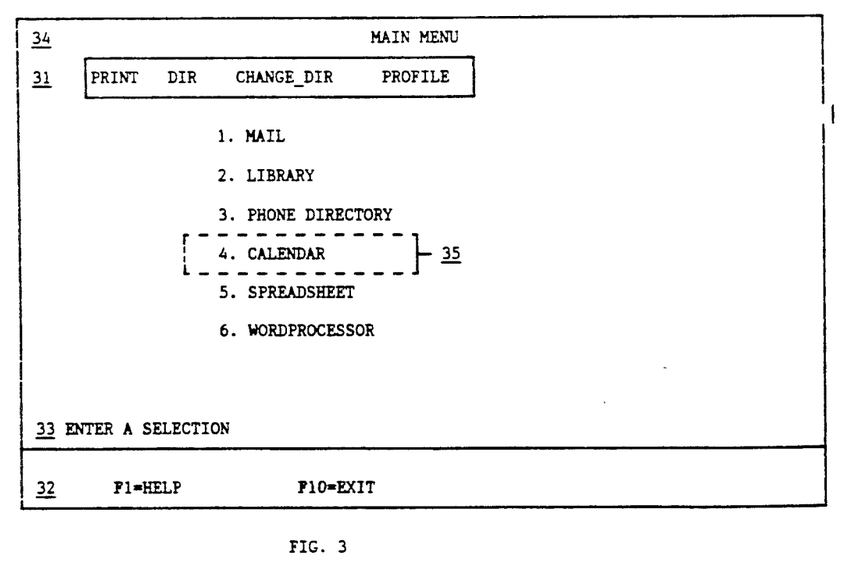
FIG. 3 illustrates the Main Menu display screen of the interactive terminal shown in FIG. 1.

FIG. 3 is representative of the display panel that is presented to the user/operator immediately after the terminal is initialized. The content of this display screen is merely an example of the type of options that might be presented to the terminal user, and the overall functional areas of the screen which remain constant and are considered part of the user interface of the system.

It is assumed that the personal computer is provided with a display management system which uses a command or action bar for the selection of actions and a vertical scroll bar function which allows selected display screens to be scrollable under the control of a mouse.

The action bar portion of the screen shown in FIG. 3 is designated by referenced character 31. The commands that are shown for the panel are merely representative. The specific commands that are displayed on the action bar will vary depending on the information being displayed and the point in the task that is being performed.

The user interface screen may also include a function key area 32 which allows the operator to request predetermined tasks or actions. Generally the task assigned to a function key does not vary within a given application program or operating system. Some function keys have obtained a defacto standard such as function key F1 which is generally used to request the display of a "help" panel. A message area designated 33 may also be provided to display prompts or error messages from the system to the operator.

The top line 34 of the screen is used to designate the name of the application program and/or the screen name. In a multi-tasking system, an area may also be provided to indicate other tasks that are presently active which have been open and are executing in a background mode.

The Main Menu screen shown in FIG. 3 includes a number of application tasks which are selectable. Moving the cursor vertically to each line causes the task to be highlighted. Pressing the enter key, causes the highlighted task to be selected. Other selection techniques described in the prior art may also be employed.

In order to more readily understand the method of displaying day calendar data in a compressed format in accordance with the present invention, a brief description of one method of calendaring events in an electronic calendaring application will first be described. The electronic calendaring arrangement to be described corresponds generally to the arrangement described in cross-referenced application Ser. No. 07/178,725. It is assumed for purposes of this description that the operator has just initialized the system and that the "Calendar" option 35 is selected. The screen shown in FIG. 4 is then displayed.

The screen shown in FIG. 4 comprises a pair of separate but functionally interrelated viewports or windows 38 and 39. It this respect it should be understood that the terminal is also provided with a state of the art program for establishing and maintaining a number of separate windows or viewports as determined by the user and the various application programs that are to be run. Viewports 38 and 39 are established in accordance with this "windowing" program.

Viewport 38 displays a time structured format in which each display line represents a fixed time period. The displayed format is developed independently of the windowing program. The area or space between a pair of horizontally adjacent lines is allocated to one time slot. As shown, each line or space between adjacent horizontal line represents a 30 minute time period or time slot. The height of the viewport 38 as shown, allows 16 time slots. The viewport therefore covers an eight hour period. Time slots prior to 8:00 a.m. and after 3:30 p.m. may be provided, if desired, in which case the information is scrollable to bring these time slots into view. In the preferred embodiment a vertical scroll bar 40, including a "thumb", "elevator" or "scroll box" 41, is provided at the right edge of the viewport to permit a scrolling operation employing mouse 21, which first selects the "thumb" with a mouse directed cursor and then drags the "thumb" up or down in a vertical direction by moving the mouse. This operation causes the time slots to scroll either up or down.

The third area 45 of the viewport is called the busy bar area. Its function is to map busy or committed time slots with a vertical busy bar which extends between the pair of horizontal lines that define the time slot. In practice, two separate busy bar columns 42, 43 are employed so that any potential scheduling conflicts can be indicated since the busy bars in each column will overlap for the conflict period in an horizontal direction. Other techniques, such as assigning a blinking attribute to the portion of the bar representing the conflict, may also be employed if horizontal space is at a premium.

Viewport 38 is also provided with its own cursor (not shown) such as a reversed video box. The width of the viewport 38 is approximately 15 display columns as shown.

The second viewport 39 is called the descriptive area and includes a Start time column 47, an End time column 48, and a descriptive area 49. The function of area 39 is to display information in detail about a scheduled event. The Start time of the event is entered in area 47 while the End time of the event is entered in area 48 and the text describing the event in the area 49. Area 49 does not, in theory, limit the amount of text that can be entered although in practice some practical maximum restraint, like 15 lines, may be imposed. It is important to note, that the number of text lines consumed by the description, are independent of the number of lines allocated to the time period scheduled for the event. For example, a description of an event scheduled for one hour, may take ten lines and a description for an event scheduled for an eight hour period may take one line.

The busy bars shown in the time structured format area 38 of FIG. 4 are directly related to the start and end times of the events that are entered in the descriptive area. For example, when the 10:00 am to 12:00 n event shown in FIG. 4 was entered into the system, the busy bar in column 42 was displayed. When the 11:00 am to 12:30 pm entry was entered, a bar was displayed in the second column 43 since there was a bar already in the first column. The fact that the entry was made in the second column and not the first, signifies that a scheduling conflict has occurred. The user can readily see the conflict since the bars in columns 42 and 43 overlap for the 11:00 am and 11:30 am time slots.

As shown in the drawing, a busy bar for a half-hour time slot begins at an imaginary horizontal line midway between the relevant displayed time and the immediately preceding displayed time. The bar ends at a similar horizontal line underneath the relevant displayed time.

As explained in the Cross-referenced application Ser. No. 07/178,725 selection of a time slot for either an initial calendar entry or an editing action on the description of an event that was previously calendared, results in automatic scrolling of the information in the descriptive area to position the appropriate line at some predetermined location on the screen. For example, that predetermined location may be the top line of the screen or a line immediately adjacent the time slot. Positioning a highlighting cursor on the 2:00 pm time slot and pressing the enter key, causes the information area to be scrolled and to place the 2:00 pm entry at the top of the descriptive area.

FIG. 5 represents one form of data structure for storing the information that has been entered into the system for the calendared events. This data structure is employed to build the screen shown in FIG. 4 and is involved in building the compressed format in accordance with the present invention. The specific details of time structured format user's default selection as established in his profile will generally be employed at the time the system is IPLed, the selection may be modified at any time by appropriate action of the user in that the length of the work day can be increased and the time span or period of a time slot can be shortened or lengthened. The busy time bars are mapped dynamically by a program that scans the data stored in the data structure shown in FIG. 5. A map similar to that shown in Table 1, below, is used to build the busy bar area of the screen of FIG. 4.

The rows of the map shown in Table 1 correspond to time slots that have been allocated in the time structured format of viewport 38. The columns designated 0 and 1, correspond to the two columns of busy bars shown in FIG. 4. As shown in Table 1, a third column may also be mapped if desired, since a column 2 is provided in the map.

TABLE 1

|  |  | COLUMNS | | |
|---|---|---|---|---|
|  |  | 42 | 43 | XX |
| TIME | _0 | 0 | 0 | 0 |
| SLOTS | _1 | 0 | 0 | 0 |
|  | _2 | 1 | 0 | 0 |
|  | _3 | 1 | 0 | 0 |
|  | _4 | 1 | 0 | 0 |
|  | _5 | 1 | 0 | 0 |
|  | _6 | 1 | 1 | 0 |
|  | _7 | 1 | 1 | 0 |
|  | _8 | 0 | 1 | 0 |
|  | _9 | 0 | 0 | 0 |
|  | _10 | 0 | 0 | 0 |
|  | _11 | 0 | 0 | 0 |
|  | _12 | 1 | 0 | 0 |
|  | _13 | 1 | 0 | 0 |
|  | _14 | 0 | 0 | 0 |
|  | _15 | 0 | 0 | 0 |

The following pseudocode statements will be of interest to programmers in developing a program to create the busy bars.

```
MAIN ROUTINE
  CONVERT TIMES TO 24 HOUR VALUES
  SORT ENTRIES BY START TIME 1ST THEN
    END TIME
  CLEAR BAR POSITION MAP
  DO UNTIL ALL ENTRIES ARE DONE
    READ ENTRY START TIME AND END
      TIME
    CONVERT START AND END TIMES TO A
      BAR POSITION
    CHECK MAP FOR USE OF BAR POSITION
    DO WHILE BAR POSITION IN USE
    MOVE OVER 1 COLUMN POSITION
    CHECK BAR POSITION
  END DO WHILE
  CALL BAR ROUTINE WITH BAR POSITION
  END OF DO UNTIL
BAR ROUTINE
  DRAW BAR
  MARK BAR POSITION MAP WITH LOCA-
    TION OF NEW BAR
```

Figure 6:
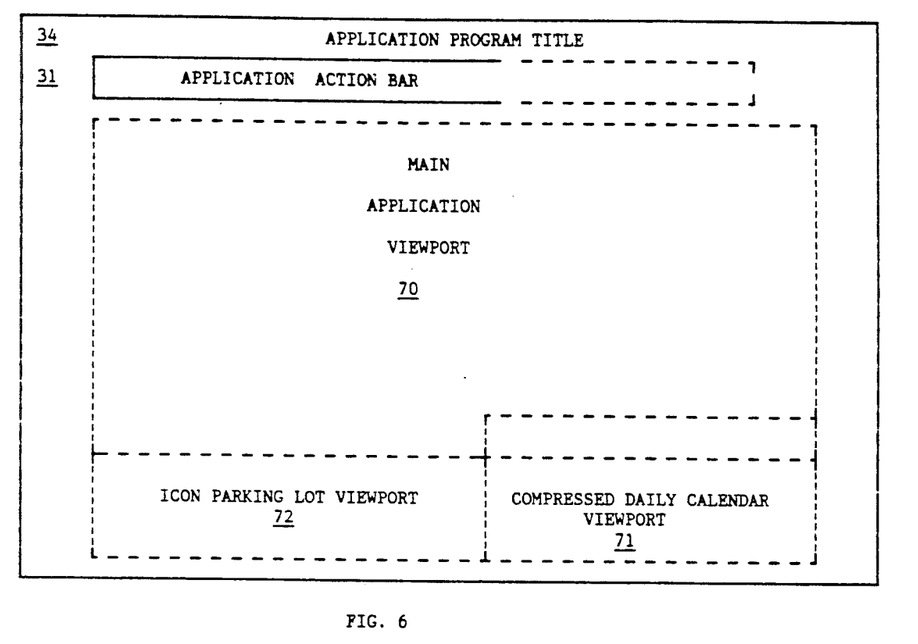
FIG. 6 illustrates the positioning on the display screen of the main viewport for displaying application data and the Compressed Day Calendar (CDC) viewport for displaying the compressed calendar data.

An example of a busy bar position map for the screen of FIG. 4 is shown in Table 1. A 1 in column 0, at rows 2–7, and 12–13, and in column 1, rows 6–8 generates the busy bars shown in FIG. 4. This map is developed in accordance with the pseudo code listing set forth above and is used to build the busy bar section of the display that appears in viewport 38. FIG. 6 illustrates the general layout of the screen that is presented to the terminal user with the method of the present invention. FIG. 6 for example would be presented to the user after he has selected an option from the Main Menu involving an application program such as the "Spreadsheet" option or the "Wordprocessor" option. In accordance with the method of the present invention, the screen is divided into at least a Main Application viewport and a Compressed Daily Calendar viewport. As shown in FIG. 6 the Main Application viewport 70 occupies a substantial portion of the screen while the CDC viewport 71 occupies the lower right hand corner of the screen. An Icon Parking Lot viewport 72 occupies the lower left hand corner of the screen. The dimensions of the respective viewports are variable in accordance with data provided to the windowing application program. In practice the size of the main application viewport is chosen to meet the users requirements for that application.

Figure 7:
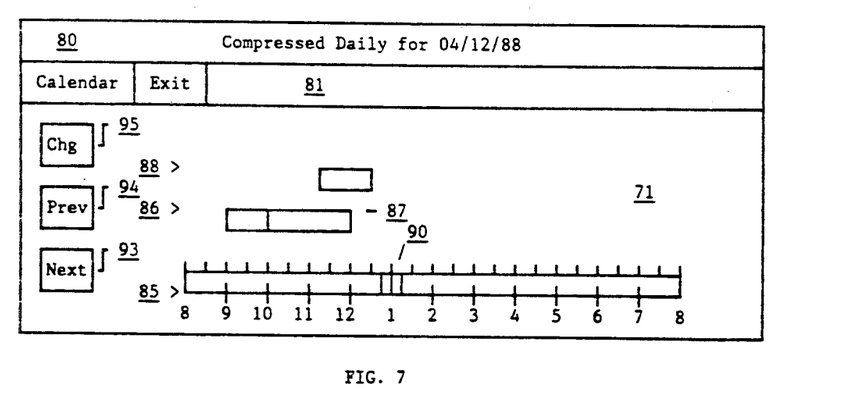
FIG. 7 illustrates the details of the Compressed Day Calendar format that is displayed in the CDC viewport shown in FIG. 6.

If, for example, the technology employed by the display provides a screen of 25 display lines and 80 columns the main application viewport 70 would be 20 by 80 while the CDC viewport 71 and Icon Parking Lot viewport 72 would each have a viewable area of 5 by 40. The actual size of the CDC viewport as shown is 7 by 40 with the top 2 lines being covered by bottom 2 lines of the viewport 70. The top two lines 80 and 81 as shown in FIG. 7 contain respectively the title of the data being displayed in viewport 71 and an action bar for selecting actions involving the information contained in this viewport. As in most windowing applications the covered portion of viewport 71 containing lines 80 and 81 can be uncovered by the user by, for example, selecting the bottom edge of viewport 70 with the mouse selecting cursor and dragging the an edge toward the top of the screen.

The CDC compressed format shown in FIG. 7 comprises a time slot line 85, which is appropriately labeled with times that correspond to the day calendar of the user and in which the time slot period also matches the time slot period of the user's day calendar. The format further includes a "Busy Bar" line 86 which functions to indicate those time slots which involve calendared events. A "Busy Bar" is positioned immediately above the time slot if it contains a calendared event. As shown the "Busy Bar" 87 extends from 9:00 am to 12:00 n which corresponds to the events shown in FIG. 4 and FIG. 5. The format further includes a Conflict line 88 which functions to indicate when more than one event has been scheduled for the particular. As shown if FIG. 7 the fact that the user has a schedule conflict for the two time slot periods of 11:00 am to 12:00 n is indicated by "Busy Bar" 89. A second conflict line may also be provided in the format if desired.

The "Busy Bars" are developed for the CDC viewport in the same manner as described in connection with the viewport 38 of FIG. 4

As shown in FIG. 7 the format also provides the user with a "Time-of-Day" indicator 90 which moves along time line 85 under the control of the systems clock. This indicator would be a different color on a color monitor or be highlighted on a monochrome monitor.

The format further provides for the user to change from the current day to either a future day or a previous day. As shown in FIG. 7 the format includes a "Next" button 93 and "Prev" (ious) button 94. By positioning the selecting cursor of the mouse on one of these buttons and "clicking" the mouse the CDC viewport is updated with the next/previous day's calendar data. The date in the title line at the top of the viewport is also changed.

In a calendaring application involving a network of terminals as shown in FIG. 2 in which user are allowed to calendar events on each others calendar, the method of the present invention provides an indication in the CDC viewport that an event has been calendared since the time that the user last viewed his daily calendar. Two situations occur which in the preferred embodiment are treated somewhat differently.

The first situation addresses the scenario where the user is currently on line and another user has just calendared an event for later on in the day. In that situation A "Busy Bar" is displayed on line 86 or 88 of the CDC format but it is given at attribute to distinguish it from any previous "Busy Bars", such as a different color, a highlight, or a blinking attribute. The user can immediately cursor to that new "Busy Bar" and "click" the mouse to see his uncompressed day calendar as shown in FIG. 4 or merely ignore the new event until a more convenient time.

The second situation involves the scenario where the newly calendared event is on some future day. In this situation the indicator 95 labeled "Chg" in the upper right hand corner of viewport 71 as shown in FIG. 7 is turned on. In the preferred embodiment, when this indicator is turned on, it means that the user's calendar includes events that have been calendared since the time that the Compressed Day Calendar screen was displayed. By cursoring to this indicator and clicking the mouse, the user is presented with a list of newly calendared events and any calendared events that have been changed, for his review and further action. If desired, the on condition of the "Change" indicator could signify that a new event was calendared or an event changed, since either the end of the last terminal session or the beginning of the terminal session. This would require an assumption that the system would keep track of the last time that the user viewed the main calendar screens.

All of the above described activity on the part of the user need not be taken until it is convenient for the user to do so. The schedule and calendar information is presented to the user on a continuous basis along with the data that is being processed by an entirely separate application program. The user never has to exit from the application program to check his day calendar merely to understand what time is free or what time is busy.

While a preferred embodiment of the present invention has been illustrated and described, it will be apparent that various modifications may be made therein without departing from the spirit of the invention or scope of the dependent claims.

We claim:

1. A method for assisting an operator of an interactive computer system having a display terminal and a system clock to readily determine the busy status of a specified time period during a day utilizing calendar events recorded in a calendar program within said interactive computer system while simultaneously displaying data on said display terminal from a non-calendar program, said method comprising the steps of:

displaying data from a non-calendar program within said display terminal;

concurrently displaying within said display terminal an elongate viewport at a location which does not materially overlap said data from said noncalendar program;

displaying within said elongate viewport an elongate time scale having indicia thereon corresponding to a plurality of sequential time periods;

displaying adjacent to said elongate time scale at selected ones of said plurality of sequential time periods a graphic indication corresponding to a calendar event recorded within said calendar program; and providing within said elongate time scale a movable graphic representation corresponding to a current time of day according to said system clock wherein the busy status of a specified time period and a relation of said specified time period to said current time of day is readily determinable.

2. The method for assisting an operator of an interactive computer system having a display terminal to readily determine the busy status of a specified time period during a day according to claim 1, wherein said step of concurrently displaying within said display terminal an elongate viewport at a location which does not materially overlap said data from said non-calendar program comprises the step of concurrently displaying within said display terminal an elongate horizontal viewport at a location which does not materially overlap said data from said non-calendar program.

3. The method for assisting an operator of an interactive computer system having a display terminal to readily determine the busy status of a specified time period during a day according to claim 2, wherein said display terminal displays at least twenty-five lines, each of which includes at least eighty character positions and wherein said step of concurrently displaying within said display terminal an elongate horizontal viewport at a location which does not materially overlap said data from said non-calendar program comprises the step of concurrently displaying within said display terminal an elongate horizontal viewport having a maximum height of five lines and a maximum width of eighty character positions at a location which does not materially overlap said data from said non-calendar program.

4. The method for assisting an operator of an interactive computer system having a display terminal to readily determine the busy status of a specified time period during a day according to claim 2, wherein said step of providing within said elongate time scale a movable graphic indication corresponding to a current time of day according to said system clock comprises the step of positioning a movable vertical line at a point on said elongate time scale corresponding to said current time of day.

5. The method for assisting an operator of an interactive computer system having a display terminal to readily determine the busy status of a specified time period during a day according to claim 1, wherein said step of displaying adjacent to said elongate time scale at selected ones of said plurality of sequential time scale a busy bar symbol at selected ones of said plurality of sequential time periods corresponding to a calendar event recorded within said calendar program.

6. An interactive computer system for permitting an operator to readily determine the busy status of a specified time period during a day utilizing calendar events recorded in a calendar program within said interactive computer system while simultaneously displaying data from a non-calendar program, said interactive computer system having a display terminal and a system clock, said interactive computer system comprising:

means for displaying data from a non-calendar program within said display terminal;

means for concurrently displaying within said display terminal an elongated viewport at a location which does not materially overlap said data from said non-calendar program;

means for displaying within said elongate viewport an elongate time scale having indicia thereon corresponding to a plurality of sequential time periods;

means for displaying adjacent to said elongate time scale at selected ones of said plurality of sequential time periods a graphic indication corresponding to a calendar event recorded within said calendar program; and means for providing within said elongate time scale a movable graphic representation corresponding to a current time of day according to said system clock wherein the busy status of a specified time period and a relation of said specified time period to said current time of day is readily determinable.

7. The interactive computer system for permitting an operator to readily determine the busy status of a specified time period during a day according to claim 6, wherein said means for concurrently displaying within said display terminal an elongate viewport at a location which does not materially overlap said data from said non-calendar program comprises means for concurrently displaying within said display terminal an elongate horizontal viewport at a location which does not materially overlap said data from said non-calendar program.

8. The interactive computer system for permitting an operator to readily determine the busy status of a specified time period during a day according to claim 7, wherein said display terminal displays at least twenty-five lines, each of which includes at least eighty character positions and wherein said means for concurrently displaying within said display terminal an elongate horizontal viewport at a location which does not materially overlap said data from said non-calendar program comprises means for concurrently displaying within said display terminal an elongate horizontal viewport having a maximum height of five lines and a maximum width of eighty character positions at a location which does not materially overlap said data from said non-calendar program.

9. The interactive computer system for permitting an operator to readily determine the busy status of a specified time period during a day according to claim 6, wherein said means for providing within said elongate time scale a movable graphic indication corresponding to a current time of day according to said system clock comprises means for positioning a movable vertical line at a point on said elongate time scale corresponding to said current time of day.

10. The interactive computer system for permitting an operator to readily determine the busy status of a specified time period during a day according to claim 6, wherein said means for displaying adjacent to said elongate time scale at selected ones of said plurality of sequential time periods a graphic indication corresponding to a calendar event recorded within said calendar program comprises means for displaying adjacent to said elongate time scale a busy bar symbol at selected ones of said plurality of sequential time periods corresponding to a calendar event recorded within said calendar program.

* * * * *